United States Patent Office 3,682,844
Patented Aug. 8, 1972

3,682,844
EXPANDABLE POLYSTYRENE AND METHOD FOR PRODUCING SAME
Edward J. Schwoegler, Munster, Ind., and Clifford P. Ronden, Edmonton, Alberta, Canada, assignors to Cupples Container Co., Austin, Tex.
No Drawing. Filed Sept. 29, 1970, Ser. No. 76,617
Int. Cl. C08j 1/26
U.S. Cl. 260—2.5 B            6 Claims

ABSTRACT OF THE DISCLOSURE

Expandable polystyrene particles having 0.5–6% by weight ethylene-vinyl acetate copolymer distributed through each bead are prepared by dispersing the copolymer in finely divided form through liquid styrene monomer and heating with agitation at at least 60° C., dispersing the resulting dispersion in an aqueous suspension medium, and forming the particles by suspension polymerization. The particles have improved fusion characteristics making it possible to produce molded, foamed articles therefrom in a shorter molding time. The molded articles have an improved and distinctive surface appearance as compared with articles molded from unmodified polystyrene particles.

---

This invention relates to expandable polystyrene and, more particularly, provides a method for preparing expandable polystyrene beads or like particles having improved fusion characteristics, the beads so produced, and improved articles formed therefrom by closed mold molding.

In recent years, foamed products made from expandable polystyrene, i.e., particles of polystyrene containing a blowing agent, have found increasingly wide acceptance in numerous industrial and consumer fields. Thus, it is now common practice to manufacture shaped articles, such as drinking cups, packaging inserts, ice chests, etc., from foamable polystyrene by closed mold molding.

The expandable polystyrene particles or beads used to manufacture molded styrene foam products can be produced in accordance with a number of well known techniques. For example, one of the most widely used processes for making expandable polystyrene or like polyvinylaromatic particles is suspension polymerization. In this process, a polymerizable monomer, e.g., styrene, is dispersed or suspended as small droplets in an aqueous suspension medium and is polymerized, with the aid of suitable polymerization catalysts, while thus suspended. Small quantities of suspending or stabilizing aids, such as inorganic phosphates, are used to stabilize the suspension and prevent agglomeration of the droplets. As will be discussed hereinbelow, the expanding or blowing agent, e.g., pentane, can be incorporated simultaneously with the polymerization of the monomer or in a separate operation.

The blowing agent contained in the polystyrene particles is activated to produce gas, e.g., pentane vapor, at a temperature below the softening range of the polystyrene. Hence, when the polystyrene particles are heated to a temperature in the softening range, the particles expand under the influence of the blowing agent. Upon cooling, the expanded particle retains its expanded condition and contains a multitude of closed cells caused by the blowing agent. When a confined mass of the expandable particles is so heated, the expanding particles fuse together, providing a cellular product having the shape of the confining structure. While the expansion and fusion can be effected in a single molding stage, in a preferred technique the beads are pre-expanded, prior to molding, to a density slightly less than that of the finished product.

Notwithstanding the particular method employed (i.e., whether the beads are pre-expanded or not) in producing products by closed mold molding, a significant time or "cycle" is required to form the shaped product. Thus, the sequence of operation in closed mold molding systems involves pre-expansion, aging, filling the mold with the loose beads, heating to fuse and expand the beads, cooling, and ejecting the molded product. Since molding is frequently accomplished with automatic machines, and economics require a high rate of production, it is highly desirable to decrease the time required for the operation. Further, with the present polystyrenes employed to produce molded foams, it is usually necessary that the beads or other particles be brought to a temperature in a very narrow range, else proper fusion is not achieved.

Prior-art workers have expended much time and effort in attempting to reduce the overall cycle time in closed mold molding of foamable polystyrene. Such efforts have been directed to improving the design of the molding apparatus as well as to altering the characteristics of the polymeric raw material. In the case of the latter, it has been proposed in U.S. Pat. 3,224,984, Roper et al., issued Dec. 21, 1965, to form cellular products from expandable polystyrene which contains from 0.01 to 0.5% by weight of a finely divided polyolefin compound, such as polyethylene wax. It is stated in this patent that the additive reduces the period required for "pressure reduction" in the molding cycle, with the term pressure reduction being defined as the time required to reduce the internal pressure within the article by the diffusion of the gases and/or vapors. Though numerous such proposals have been made, the problems of unduly long molding times and critically narrow temperature limits still plague the industry.

Another problem has been the fact that, though the usual polystyrenes yield a foamed product of pleasing white color, the surface appearance of such products frequently leaves much to be desired, particularly in cases where precisely the optimum temperature is not achieved during molding. Efforts have been made to improve the surface appearance, as by special molding procedures which render the exposed surface of the article more dense, or by applying coatings or films to the exposed surface, but such procedures have not solved the problem.

A general object of this invention is to provide an improved expandable polymeric material, and a process for preparing same, said polymeric material being particularly adapted for use in preparing cellular products by closed mold molding.

A further and more particular object is to provide a process for preparing a foamable polymeric material comprising predominately polystyrene but having better fusion characteristics than polystyrene to effect a significant improvement in the processability of the polymeric material when forming cellular products by closed mold molding.

Another object is to provide a novel foamable polymeric material comprising predominately polystyrene but having a lower softening temperature limit and a wider softening temperature range and better fusion characteristics than polystyrene, thus providing better bonding, a shorter molding time, and fewer rejects.

A still further object is to provide foamed polystyrene articles, e.g., drinking cups, having a pleasing, ceramic-like, white surface superior to prior-art articles.

The manner in which the foregoing and other objects are achieved in accordance with this invention will be evident from the following detailed description wherein particularly advantageous method and article embodiments are disclosed for illustrative purposes.

Broadly considered, the invention is based on the discovery that foamable polystyrene particles, especially beads, can be prepared which contain a minor proportion of ethylene-vinyl acetate copolymer uniformly distributed through each bead, and that the resulting particles can be converted into shaped products in shorter times, and therefore at less cost, with the products being superior to those made with particles of polystyrene alone.

The advantages of the invention depend upon the ethylene-vinyl acetate copolymer being uniformly distributed through the polystyrene. Such uniform distribution is accomplished by first distributing the initially solid copolymer through styrene monomer in such fashion as to provide a material having the appearance of a clear solution, and then polymerizing the styrene to provide a product having a viscosity average molecular weight in the range of 125,000–225,000. Further, the initial "solution" of the copolymer in styrene must be stable to assure that uniformity persists until polymerization has proceeded beyond the viscous stage. To achieve the desired uniformity and stability, the ethylene-vinyl acetate copolymer in particulate form is mixed with the styrene and the mixture heated, with continued agitation, at a temperature of at least 40° C., but below the boiling point of styrene until the appearance of a clear solution is obtained. The heating period varies generally inversely as the temperature employed, relatively short times being effective to provide solution at the higher temperatures in the range, and relatively longer times being required at the lower limit. At the upper limit, times as short as 30 seconds are effective, while times up to several, e.g., 6, hours are allowable. Advantageously, the initial mixture is heated at 48–55° C. for 5–45 minutes. The ethylene-vinyl acetate copolymer is best dissolved in the total quantity of styrene monomer to be polymerized, though it is possible to make the initial solution by using only a portion of the styrene monomer so long as the resulting solution is diluted with the remaining styrene without cooling the initial solution below about 40° C. before diluting. In this connection, cooling of the solution frequently yields a gel which cannot be properly suspended in the aqueous suspension medium for polymerization.

To obtain the benefits of the invention, the ethylene-vinyl acetate copolymer is employed in an amount equal to 0.5–6% of the weight of the styrene, with optimum results being achieved when the ethylene-vinyl acetate copolymer amounts to 1–3% of the styrene weight. Within this range of proportions, more of the copolymer is employed when the polystyrene is of higher molecular weight, and a lower proportion of the copolymer is used when the polystyrene is of lower molecular weight. In general, the copolymer favorably modifies the processing characteristics of the foamable polystyrene so that a polystyrene of higher molecular weight can be processed, e.g., molded, under conditions which would be considered appropriate for a polystyrene of lower molecular weight. In the production of foamed polystyrene drinking cups and like molded articles, it is particularly advantageous to employ 1–3% of the copolymer, with the molecular weight of the polystyrene being in the range of 160,000–200,000.

The copolymer-modified polystyrene can best be prepared by suspension polymerization, the apparent solution of copolymer in styrene being added to an aqueous suspension medium in a suitable reactor, and polymerization then being carried out under conditions of agitation, temperature, catalysis and time to yield a substantially monomer-free product having a viscosity average molecular weight of 125,000–225,000. The polymerized product is in the form of discrete beads which, rather than having the clear appearance of polystyrene, are white and opaque. Of the product, each bead consists essentially of polystyrene with ethylene-vinyl acetate copolymer distributed uniformly therethrough, the copolymer being essentially unmodified and the polystyrene itself apparently retaining its normal characteristics. The overall characteristics of the beads, however, are those contributed by the two polymeric materials. In this regard, it appears that the minor proportion of ethylene-vinyl acetate copolymer is effective to cause marked changes in the overall characteristics of the beads, particularly by lowering the fusion temperature and broadening the fusion temperature range, primarily because the copolymer is uniformly distributed throughout the polystyrene of each bead.

So long as the ethylene-vinyl acetate copolymer is employed in the aforementioned proportions and is initially dissolved in the styrene monomer, the well known conditions of time, catalysis, pressure and temperature for suspension polymerization of styrene to a viscosity average molecular weight of 125,000–225,000 are suitable. Advantageously, however, the temperature of the suspension polymerization reaction mixture is maintained below 95° C. until polymerization has proceeded to that point at which the beads are semi-hard and no longer sticky, else the presence of the copolymer will promote agglomeration of the beads and require extreme and undesirable modification of the suspension system.

Without employing the step of initially dissolving the ethylene-vinyl acetate copolymer in the liquid styrene monomer to provide a clear apparent solution, beads having the desired characteristics have not been obtained. Thus, merely suspending the copolymer in the styrene monomer, with the copolymer persisting in particulate form, leads to such stickiness of the beads that agglomeration occurs and the suspension polymerization procedure is defeated. Similarly, attempts to introduce the copolymer into the suspension system during polymerization, e.g., at or near the particle identification stage, results in formation of discrete beads of the copolymer and beads in which the copolymer content varies widely, even when agglomeration is prevented.

The beads can be recovered from the aqueous suspension medium in conventional fashion and dried. The recovered beads can be impregnated with a suitable blowing agent, typically pentane, isopentane, cyclopentane, hexane, heptane, or petroleum ether, all lower aliphatic hydrocarbons boiling in the range of 20–80° C. Impregnation can be carried out in any suitable fashion, as described, for example, in U.S. Pat. 2,905,261, issued to Karl Buchholz et al. on Aug. 23, 1960. Impregnation occurs generally as with pure polystyrene particles, save that greater care must be taken to avoid agglomeration and clumping of the beads. Typically, an amount of water equal to the weight of the beads to be impregnated is employed in a sealed reactor, with the addition of 0.1–0.4% polyvinyl alcohol and 0.1–0.6% tricalcium phosphate (NF grade), based on the weight of the beads, as suspending agents. The beads are added, the reactor sealed and purged with nitrogen. Pentane in an amount equal to 12–17% of the bead weight is run in, the pressure in the reactor adjusted to 100 p.s.i. by introducing nitrogen, the reactor heated to a product temperature of 125–140° F., with an attendant rise in pressure to, e.g., 130–150 p.s.i., and those conditions of temperature and pressure maintained, for 3–6 hours, the suspension being agitated continuously throughout.

Alternatively, the blowing agent can be introduced during suspension polymerization, typically by introducing the blowing agent into the reactor at a time when polymerization has proceeded at least to the particle identification point, or by introducing the blowing agent into the original apparent solution of the copolymer in the styrene monomer.

Regardless of the method employed for introducing the blowing agent, the blowing agent content of the beads should be in the range of 4–10% by weight.

The ethylene-vinyl acetate copolymers employed are those which have an ethylene-to-vinyl acetate weight ratio of 6:1 to 1:2 and an average molecular weight of 5,000–50,000, copolymers with an average molecular weight of 10,000–30,000 being particularly suitable. The ethylene-vinyl acetate copolymers useful according to the invention are further characterized by being substantially unmodified, exhibiting a melt index of at least 1.2 grams/10 minutes determined by American Society of Testing Materials test procedure D1238–62T.

The following examples are illustrative:

EXAMPLE 1

Employing a 10-gallon glass-lined reactor equipped with a rotary agitator and a steam jacket, 10,851 grams of liquid styrene monomer was placed in the reactor and 217 grams of finely divided solid ethylene-vinyl acetate copolymer then added. The copolymer employed was that distributed by U.S.I. Chemicals Division, National Distillers & Chemical Corporation, New York, under the trademark Microthene MU 760 having an average particle size of 200–300 microns, a medium average molecular weight, i.e., in the range of 20,000–30,000, and a melt index, determined by ASTM procedure D1238–62T, of 3.0 grams/10 minutes. With continued agitation, the resulting mixture was heated from room temperature to 52° C. over a period of 30 minutes. At the end of that time, the material was in the form of a clear liquid.

Using a separate vessel, 8.14 grams of polyvinyl alcohol was sifted into 500 cc. of demineralized water and, with continual agitation, the water was heated to 90° C. and agitation continued for 30 minutes at that temperature to completely dissolve the polyvinyl alcohol. Heating was then stopped and, with continued agitation, 108 grams of tricalcium phosphate and 13 grams of tetralin sodium sulfonate were added, agitation being continued until the latter is dissolved. The polyvinyl alcohol employed was 89–87% hydrolyzed and had a viscosity of 34–45 centipoises, determined in 4% aqueous solution at 20° C. The tricalcium phosphate was "micronized," predominately comprising particles of 3 microns with a minor proportion of particles up to 5 microns, none less than 1 micron.

Without cooling of the reactor contents, 10,846 grams of deionized water was added and, with the agitator operating the water containing the polyvinyl acetate, tricalcium phosphate and tetralin sodium sulfonate was also added, the total contents of the reactor then being at approximately 30° C. Speed of the rotary agitator was adjusted to 150 r.p.m. and agitation at that speed was continued throughout the remainder of the polymerization run. The temperature of the aqueous suspension was raised to 45° C. and 16.3 grams of benzoyl peroxide was then added. Heating was then carried out to provide the following temperature profile:

| Time (hrs. and mins.) | Temperature (° C.) |
| --- | --- |
| 0:00 (heat up) | 45 |
| 0:40 (hold) | 85 |
| 1:40 (heat up) | 85 |
| 2:40 (hold) | 90.5 |
| 9:10 (heat up) | 90 |
| 12:30 | 130 |

Seven 1-gram additions of calcium hydroxide were made, the first at time 1:40 and the others at 1-hour intervals, to prevent the pH from falling to a value which would cause agglomeration. Two 2.7-gram additions of benzoyl peroxide were made at times 5:20 and 7:10, respectively. 4.1 grams of tert-butyl perbenzoate was added at time 9:10. At time 12:30 the reaction was terminated by cooling to room temperature, the beads were recovered, washed with water, and dried in an air flow oven at 70° C.

The recovered beads were of uniform spherical configuration and had an opaque white apperance. No significant bead-to-bead variations were observable by microscopic inspection. Viscosity average molecular weight of the polymeric material of the beads was 167,500.

By screening, the bead size distribution was determined. Beads having a diameter in the range of 300–600 microns constituted 81% by weight of the total product.

A sample of the beads so prepared and having a size range of 300–600 microns was impregnated with pentane using a 1 gallon stainless steel agitator-equipped, electrically heated autoclave. In a separate vessel, 1.5 grams of polyvinyl alcohol (35–45 centipoises; 87.2–89.2% hydrolysis) was dissolved in 100 grams of deionized water, and 3 grams of NF grade tricalcium phosphate was then added. The resulting suspension was placed in the autoclave and 650 grams of deionized water added with agitation to establish the suspension medium. 750 grams of the beads obtained above was then added. The autoclave was then sealed, purged with nitrogen, and pressured to 100 p.s.i. with nitrogen. With continual agitation of the suspension, 112.5 grams of normal pentane was introduced into the autoclave and the suspension was heated to 135° F. and maintained at that temperature for 4 hours. The autoclave was then cooled to room temperature, vented, and the contents of the reactor dropped onto a screen to recover the beads, which were then washed with water and dried in a forced air oven at an air temperature of 40° C. The pentane content of the dried beads, determined after 12 hours of drying, was 6.85% by weight. After standing 3 days at room temperature in a closed container, the pentane content was 6.79%.

EXAMPLE 2

The polymerization run of Example 1 was repeated, except that the copolymer was introduced into the liquid styrene monomer, with continual stirring, heated to 40° C., and held at that temperature for 30 min., stirring being continuous throughout. The resulting material had the appearance of a clear solution. Results of the polymerization run were comparable to those in Example 1. The polymerization run of Example 1 was again repeated, save that the copolymer was introduced into the styrene and the liquid then heated to 100° C., with the apparent solution appearance occurring promptly during such heating.

EXAMPLE 3

An attempt was made to duplicate the procedure of Example 1, but with the particulate ethylene-vinyl acetate copolymer being simply dispersed in the styrene monomer at room temperature by agitation. The reaction system became one gummy mass within the first 3 hours of the run and had to be dumped.

EXAMPLE 4

The procedure of Example 1 can be duplicated, successfully substituting for the ethylene-vinyl acetate copolymer of that example copolymers marketed by E. I. du Pont de Nemours & Co., Wilmington, Del., under the trademark Elvax and having a melt index of 1.6–2.4 grams/10 minutes by ASTM D1238–62T, and average molecular weights and ethylene-to-vinyl acetate ratios in the aforementioned ranges.

EXAMPLE 5

Molding characteristics of the expandable beads obtained in Example 1 were compared with those of pure polystyrene beads similarly prepared, the comparison being made by molding 6 oz. foamed polystyrene drinking cups in a conventional closed mold molding of the general type disclosed, for example, in U.S. Pat. 3,125,-780, issued Mar. 24, 1964, to J. M. Harrison et al., the mold of the machine defining a vented cavity of the shape and size desired for the cup. Two samples of beads were employed, sample A being the beads of Example 1, sample B being beads of pure polystyrene, produced and impregnated generally as in Example 1, with a viscosity average molecular weight of 155,000. The free monomer content for both samples was less than 0.1% by weight.

Both samples were pre-expanded in a laboratory scale, closed chamber, hot-air type pre-expander. The conditions during pre-expansion were as follows:

|  | Sample A | Sample B |
|---|---|---|
| Air temperature, °F | 260 | 330 |
| Air pressure, hot circulating in p.s.i. | 65 | 55 |
| Residence time, in minutes | 2 | 3 |

Both samples were pre-expanded to a bulk density of 4.2 lbs./cu. ft.

Drinking cups were molded from both samples, with the molding machine operated through the conventional "fill," "dwell," "cook," and "cool" cycle, with times for each portion of the cycle being adjusted until optimum results were obtained. The molds were cycled from 120° F. to 215° F. surface temperature, the beads being introduced into the mold cavity at the lower temperature. Steam and water pressures in p.s.i. were as follows:

|  | Sample A | Sample B |
|---|---|---|
| Steam header | 118 | 118 |
| Dwell | 50 | 60 |
| Cook | 20–30 | 30–40 |
| Water, cooling | 60 | 60 |

The time cycles, in seconds and ignoring time for opening and closing, were as follows:

|  | Sample A | Sample B |
|---|---|---|
| Fill | 1.0 | 1.0 |
| Dwell | 0.75 | 1.5 |
| Cook | 0.75 | 1.25 |
| Cool | 4.00 | 3.5 |
| Total | 6.50 | 7.25 |

It was observed that the beads of sample A exhibited better and more uniform fusion, even at the lower times and temperatures, and difficulty was encountered in obtaining satisfactory cups with sample B at the relatively low temperatures and times employed for that sample.

A number of molding tests employing the machine and procedure of Example 5 with ethylene-vinyl acetate-modified polystyrene beads produced by the procedure outlined in Example 1 show that superior cups can be molded with the beads of this invention with machine cycle times consistently more than 10% shorter than the average cycle time required for commercially available foamable polystyrene beads. Typically, cycle times of 5–7 seconds can be achieved with the beads of this invention, as compared to an average cycle time of 8–10 seconds for the commercially available polystyrene beads.

The cups molded from sample A exhibited a distinctly different surface appearance, as compared to foamed polystyrene cups presently marketed and to the cups molded from sample B. In particular, the cups from sample A were whiter, more opaque, exhibited less of an impression of bead identity, and had an appearance suggestive of white china or porcelain.

What is claimed is:

1. A method for producing a foamable polystyrene material suitable for production of shaped articles by closed mold molding in shorter molding times than are required for conventional foamable polystyrene, comprising
   providing a clear apparent solution of ethylene-vinyl acetate copolymer in liquid styrene monomer by maintaining the styrene monomer and ethylene-vinyl acetate copolymer at a temperature of at least 40° C., but below the boiling point of styrene monomer for a time corresponding generally inversely to the temperature, the time being at least 30 sec. for temperatures at the upper limit of said range and up to several hours for temperatures at the lower limit of said range,
   said ethylene-vinyl acetate copolymer having an ethlene-to-vinyl acetate weight ratio of from 6:1 to 1:2, an average molecular weight of 5,000–50,000, and a melt index of at least 1.2 grams/10 min. determined by American Society of Testing Materials test procedure D1238–62T;
   dispersing the clear apparent solution, at an ethylene-vinyl acetate copolymer content equal to 0.5–6% of the weight of the styrene monomer, in an aqueous suspension medium;
   subjecting the resulting suspension to conditions of agitation, time, temperature and catalysis to polymerize the polystyrene to a viscosity average molecular weight in the range of 125,000–225,000; and
   recovering the polymerized product in the form of white opaque beads each consisting of polystyrene with said ethylene-vinyl acetate copolymer distributed uniformly therethrough,
   the method further comprising integrating with said polymeric material a normally liquid blowing agent having a boiling point below 80° C. and amounting to 4–10% by weight of the polymeric material.

2. The method according to claim 1, wherein
   the viscosity average molecular weight of said polystyrene is in the range of 160,000–200,000 and said ethylene-vinyl acetate copolymer amounts to 1–3% of the weight of the styrene monomer.

3. The method according to claim 1, wherein
   the styrene monomer and ethylene-vinyl acetate copolymer are maintained at 48–55° C. for 5–45 min.

4. The method for producing a shaped foamed polymeric article, comprising
   providing a closed mold defining a vented cavity having the shape and dimensions of the article to be formed;
   filling said cavity with pre-expanded foamable polystyrene beads produced according to the method defined in claim 1; and
   fully expanding said beads, to cause the same to fuse into a completed closed cell foamed article, by heating said beads to a temperature which is at least 10% below the temperature required to produce the same article from pre-expanded foamable beads of pure polystyrene.

5. The method according to claim 4, wherein
   said beads produced according to the method of claim 1 contain ethylene-vinyl acetate copolymer in an amount equal to 1–3% of the polystyrene weight and the polystyrene thereof has a viscosity average molecular weight in the range of 160,000–200,000.

6. A shaped article produced according to the method defined in claim 1,
   the exposed surface of said article having a white, opaque, china-like appearance with a negligible visual impression of particle identity.

References Cited

UNITED STATES PATENTS

| 3,224,984 | 12/1965 | Roper et al. | 260—2.5 B |
| 3,468,820 | 9/1969 | Buchholz et al. | 260—2.5 B |
| 3,446,760 | 5/1969 | Nowak et al. | 260—878 |

SAMUEL H. BLECH, Primary Examiner

M. FOELAK, Assistant Primary

U.S. Cl. X.R.

260—29.6 RB, 93.5 W, 878 R